Dec. 4, 1934.  R. S. SANFORD  1,982,832

BRAKE

Filed April 27, 1931

INVENTOR.
ROY S. SANFORD
BY
ATTORNEY

Patented Dec. 4, 1934

1,982,832

UNITED STATES PATENT OFFICE 1,982,832

BRAKE

Roy S. Sanford, South Bend, Ind., assignor to Bendix Brake Company, South Bend, Ind., a corporation of Illinois Application April 27, 1931, Serial No. 533,234

7 Claims. (Cl. 188—78)

This invention relates to brakes and more particularly to internal expanding brakes.

Broadly, the invention comprehends an operating means for the friction element of an internal expanding brake including an operating cam arranged to avoid cam kick and loss of pedal movement in forward braking.

An object of the invention is to provide an operating means for the friction element of a brake constructed and arranged to avoid registering of the reaction of the friction element on the operating means.

Another object of the invention is to provide an operating means for the friction element of a brake adapted for circumferential movement without material change in its relation to the friction element.

An important feature of the invention is a cam for actuating a friction element and a shaft for the cam extending through one end of the friction element.

Another important feature is an operating means for a friction element, a shaft extending through the friction element and linkage connecting the shaft to the cam.

A further feature of the invention is to provide a brake having an operating shaft and means for lubricating the shaft arranged to avoid lubrication of the friction elements of the brake.

Another feature of the invention is an operating shaft having a lubricating means including means for relieving the shaft of excessive grease.

Other features of the invention will appear from the following description taken in connection with the drawing, which forms a part of this specification, and in which.

Figure 1:
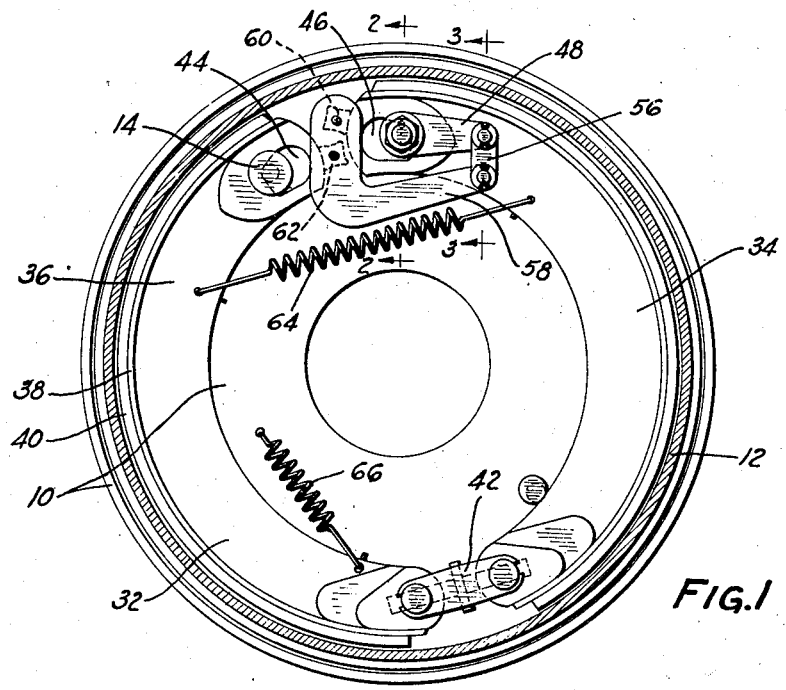
Figure 1 is a vertical sectional view of a brake illustrating the friction elements in side elevation and showing the invention as applied.
Figure 2:
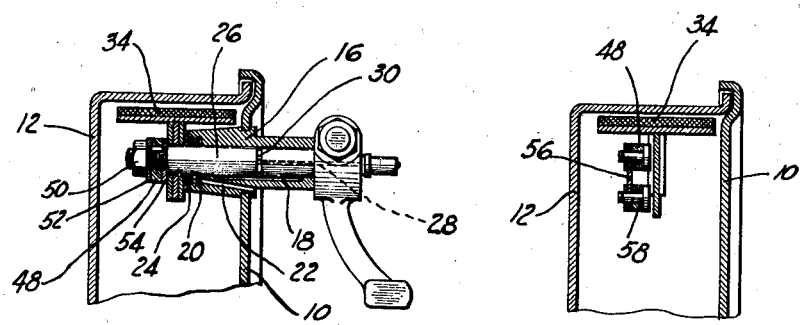
Figure 2 is a section substantially on line 2—2, Figure 1.
Figure 3:
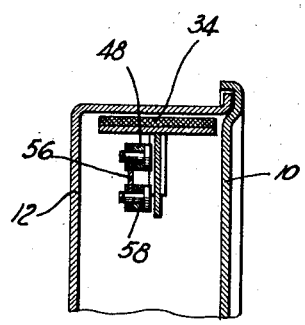
Figure 3 is a section substantially on line 3—3, Figure 1.

Referring to the drawing for more specific details of the invention, 10 represents a fixed support such as a backing plate which may be secured to a steering knuckle or to an axle. Associated with the backing plate is a rotatable drum 12 which may be secured to a wheel, not shown. The drum has positioned thereon an anchor 14, and arranged on the backing plate adjacent the anchor is a fixed bracket 16 arranged to function as another anchor.

As shown, the bracket has formed therein a longitudinal oil duct 18 and a circumferential oil duct 20 communicating with a relief duct 22, and the end of the bracket is arranged for the reception of a grease retaining washer 24. The bracket has positioned therein a shaft 26 provided with an oil duct 28 communicating with a centrifugal oil duct 30 in the shaft which communicates with the oil duct 18 in the bracket and the oil duct 28 communicates with the conventional grease cup.

Positioned for movement on the fixed support is a friction device including a primary shoe 32 and a secondary shoe 34. These shoes are of the conventional type, each comprising a web 36 supporting a rim 38 to which is suitably secured a lining 40 adaptable for cooperation with the drum. The shoes are connected at their articulated ends by an adjusting device 42 and are provided with openings 44 and 46 in their separable ends for the reception of the anchor 14 and the shaft 26.

The shaft 26 has keyed upon its inner end an arm 48 and retained upon the shaft by a nut 50 are suitable washers 52 and 54 interposed between the nut and arm and the lever and a shoulder on the shaft. The arm 48 is connected by a link 56 to a bell crank lever 58 having arranged upon one end pivoted blocks 60 and 62 adapted to engage the shouldered ends of the shoes 32 and 34.

The shoes are connected by a suitable return spring 64 and connecting the shoe 32 to the fixed support or backing plate is an auxiliary return spring 66. These springs serve to return the shoes to the off position and to retain them when in the off position in proper spaced relation to the drum.

In operation, force is applied through a suitable lever to rotate the shaft 26. Upon rotation of the shaft 24, force is applied to the bell crank lever 58 through the link 56 connecting the lever to the arm 48 on the shaft to spread the shoes into drum engagement. Because of the particular arrangement of the bell crank lever and the operating arm on the shaft and the linkage between these elements chattering of the friction element is not registered on the operating means and loss in pedal movement in forward braking is negligible or nil.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a friction element having separable ends, an anchor for one of the ends, an operating shaft extending through the other end, an operating cam between the separable ends and linkage connecting the operating cam to the shaft.

2. A brake comprising a friction element having separable ends, an anchor for one of the ends, an operating shaft extending through the other end, a bell crank lever having one end between the separable ends and linkage connecting the other end of the bell crank lever to the shaft.

3. A brake comprising a friction element having separable ends, an anchor for one of the ends, an operating shaft extending through the other end, an arm on the shaft, a bell crank lever having one end between the separable ends and a link connecting the other end of the bell crank lever to the arm.

4. A brake comprising a friction element having separable ends, an anchor for one of the ends, a shaft extending through the other end, a bell crank lever having one end positioned between the separable ends, rotatable blocks on the bell crank lever engaging the separable ends and a link connecting the other end of the bell crank lever to the arm.

5. A brake comprising a friction element having separable ends, an anchor for one of the ends, an operating shaft extending through the other end, an arm on the shaft, a bell crank lever having one end between the separable ends and its other end substantially parallel to the arm and a link connecting the bell crank lever and arm.

6. A brake comprising a fixed support, a friction device on the support having separable ends, an anchor for one of the ends, an operating shaft extending through the other end, an arm on the shaft, a bell crank lever, rotatable blocks on the lever for engagement with the separable ends, a link connecting the other end of the lever to the arm and means for rotating the shaft.

7. A brake comprising a fixed support, a rotatable drum associated therewith, a friction device on the fixed support adaptable for cooperation with the drum, an anchor for one end of the friction device, an operating shaft extending through the other end of the friction device, an arm on the operating shaft, a bell crank lever having one leg between the separable ends and its other leg substantially parallel to the arm, rotatable blocks on the bell crank lever for engaging the separable ends, a link connecting the bell crank lever to the arm and means for rotating the shaft.

ROY S. SANFORD.